(12) United States Patent
Naffziger et al.

(10) Patent No.: US 9,052,885 B2
(45) Date of Patent: Jun. 9, 2015

(54) USING TEMPERATURE MARGIN TO BALANCE PERFORMANCE WITH POWER ALLOCATION

(71) Applicant: Advanced Micro Devices, Inc., Sunnyvale, CA (US)

(72) Inventors: Samuel D. Naffziger, Fort Collins, CO (US); Michael Osborn, Hollis, NH (US); Sebastien Nussbaum, Lexington, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 209 days.

(21) Appl. No.: 13/723,276

(22) Filed: Dec. 21, 2012

(65) Prior Publication Data

US 2014/0181536 A1 Jun. 26, 2014

(51) Int. Cl.
*G06F 1/00* (2006.01)
*G06F 1/26* (2006.01)
*G06F 1/20* (2006.01)

(52) U.S. Cl.
CPC . *G06F 1/26* (2013.01); *G06F 1/206* (2013.01)

(58) Field of Classification Search
CPC ......... G06F 1/206; G06F 1/26; G06F 9/4893; G06F 9/5094
USPC ......................................................... 713/300
See application file for complete search history.

(56) References Cited

U.S. PATENT DOCUMENTS

| 7,412,612 B2 * | 8/2008 | Maple et al. .................. 713/320 |
| 7,724,149 B2 * | 5/2010 | Kettler et al. ................. 340/584 |
| 7,886,172 B2 * | 2/2011 | Bose et al. .................... 713/324 |
| 8,316,250 B2 * | 11/2012 | Trautman et al. ............. 713/320 |
| 2006/0259793 A1 * | 11/2006 | Moore et al. .................. 713/300 |
| 2009/0265568 A1 * | 10/2009 | Jackson ........................ 713/320 |

\* cited by examiner

*Primary Examiner* — Mark Connolly
(74) *Attorney, Agent, or Firm* — Volpe and Koenig, P.C.

(57) ABSTRACT

A method and apparatus using temperature margin to balance performance with power allocation. Nominal, middle and high power levels are determined for compute elements. A set of temperature thresholds are determined that drive the power allocation of the compute elements towards a balanced temperature profile. For a given workload, temperature differentials are determined for each of the compute elements relative the other compute elements, where the temperature differentials correspond to workload utilization of the compute element. If temperature overhead is available, and a compute element is below a temperature threshold, then particular compute elements are allocated power to match or drive toward the balanced temperature profile.

21 Claims, 8 Drawing Sheets

USING TEMPERATURE MARGIN TO BALANCE PERFORMANCE WITH POWER ALLOCATION

TECHNICAL FIELD

The disclosed embodiments are generally directed to power allocation.

BACKGROUND

Accelerated processing units (APUs) contain computation elements that can consume much more power in the aggregate than the rated cooling capability of the systems in which they are deployed. Optimal power allocation to the various compute elements is necessary to increase system performance. However, optimal power allocation varies from workload to workload based on compute element utilization. For instance, a static allocation of power between central processing units (CPUs) and a graphics processing unit (GPU), (for example, an even power allocation between the CPUs and GPU), will result in low performance if the workload is only utilizing the CPU. In another example, greedy power allocation methods result in compute starvation for many heterogeneous workloads. It is also difficult and error-prone to try and dynamically analyze workload characteristics to determine the optimal power allocation.

SUMMARY OF EMBODIMENTS

A method and apparatus using temperature margin to balance performance with power allocation is described herein. Nominal, middle and high power levels are determined for compute elements. A set of temperature thresholds are determined that drive the power allocation of the compute elements towards a balanced temperature profile. For a given workload, temperature differentials are determined for each of the compute elements relative the other compute elements, where the temperature differentials correspond to workload utilization of the compute element. If temperature overhead is available, and a compute element is below a temperature threshold, then particular compute elements are allocated power to match or drive toward the balanced temperature profile.

BRIEF DESCRIPTION OF THE DRAWINGS

A more detailed understanding may be had from the following description, given by way of example in conjunction with the accompanying drawings wherein.

DETAILED DESCRIPTION

Optimal power allocation to various compute elements is necessary to increase system performance. Optimal, however, will vary from workload to workload based on which compute element is the most heavily utilized. Discrete power level settings are used by power management systems to control a temperature of a compute element below an operating maximum temperature. For some allocation methods, the power allocation at a compute element is set high enough, (designated as a high power level), to hit maximum temperature when the other compute elements are in idle mode. The low power level is set low enough so that the compute element does not overheat when all compute elements are active. This creates a large gap between the high and low power levels such that for intermediate cases the power management operation is inefficient, i.e. hopping back and forth (dithering) between the two power levels.

Figure 1:
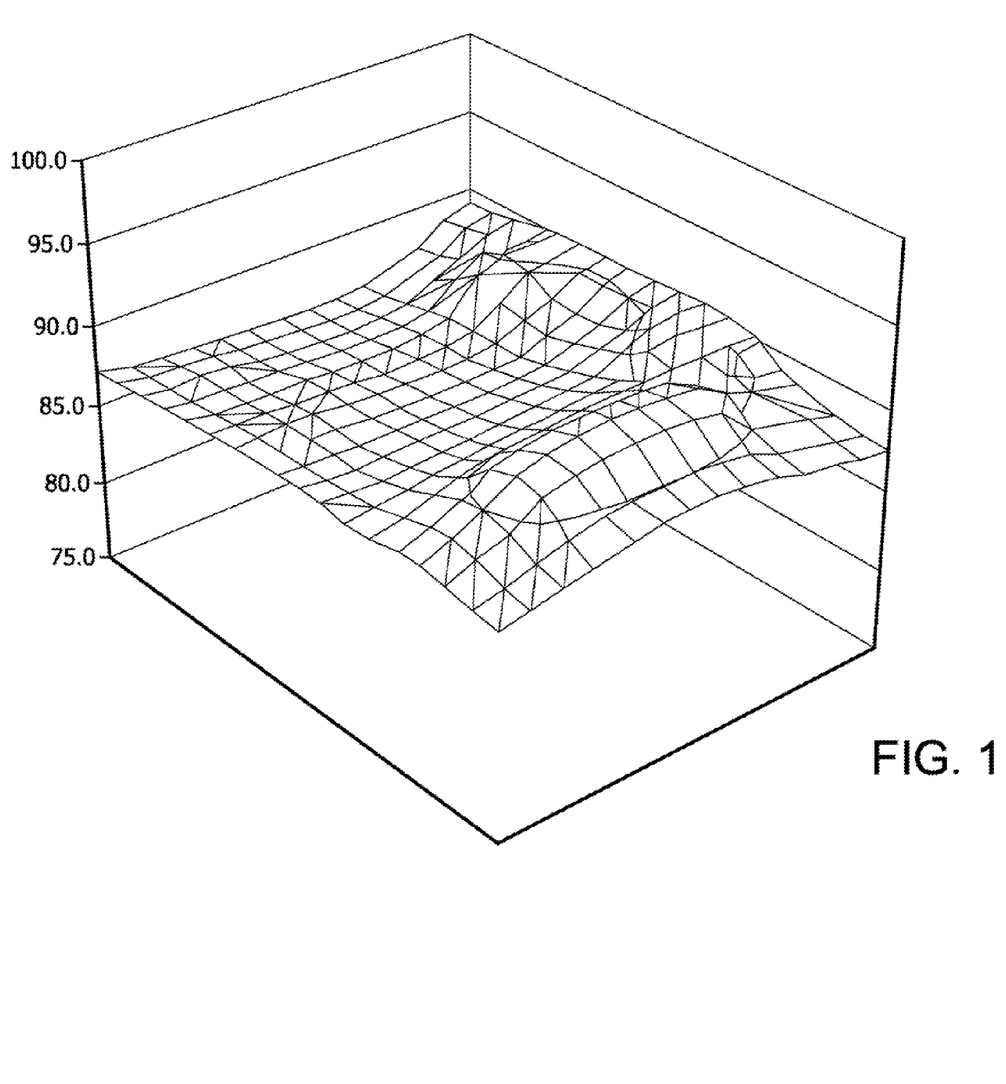
FIG. 1 is an example plot of a graphics processing unit (GPU) centric temperature profile in accordance with some embodiments.
Figure 2:
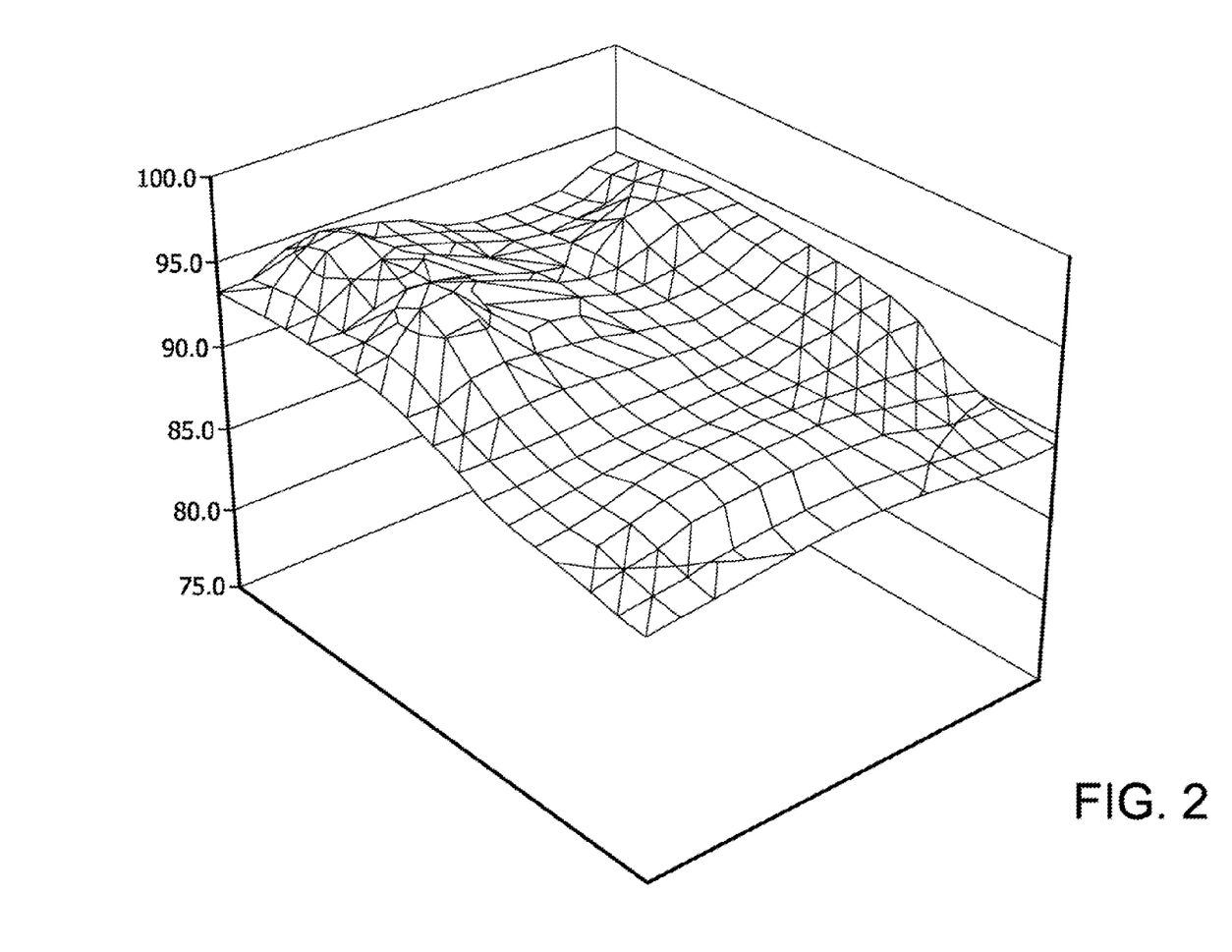
FIG. 2 is an example plot of a balanced GPU and central processing unit (CPU) temperature profile in accordance with some embodiments.
Figure 3:
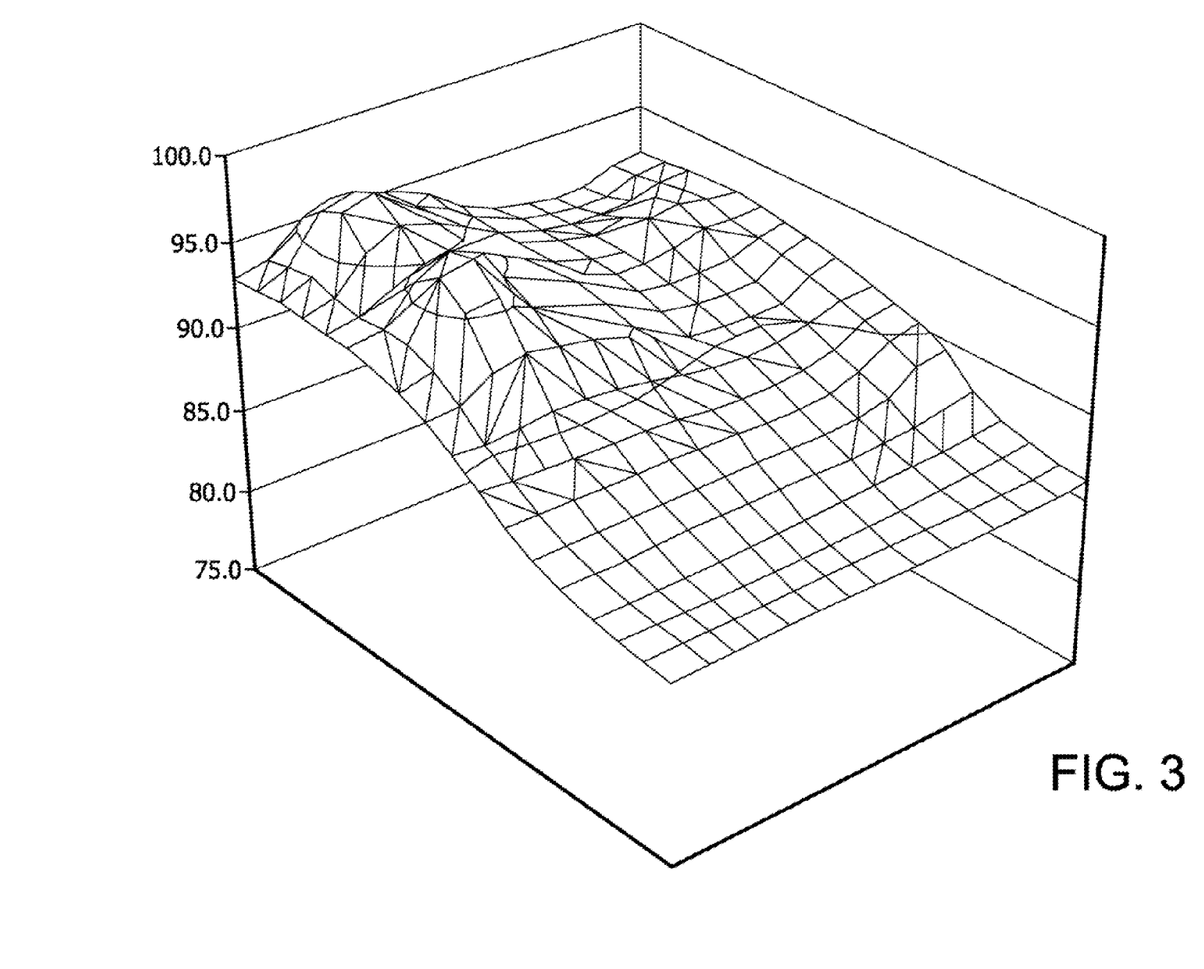
FIG. 3 is an example plot of a CPU centric temperature profile in accordance with some embodiments.

Described herein are a method and apparatus that uses temperature margins to determine that an intermediate operating point is appropriate, and that power allocation set at this intermediate operating point, a middle power level allocation, achieves greater operational efficiency. For example, FIGS. 1, 2 and 3 represent temperature profiles for a graphics processing unit (GPU) centric temperature profile, a balanced GPU and central processing unit (CPU) temperature profile, and a CPU centric temperature profile, respectively. The balanced GPU and CPU temperature profile, which corresponds to the intermediate operating point, represents the most computation for a given piece of silicon, i.e. die. In this instance, all of the computing elements are working at an optimal throughput, i.e. the computing elements are neither at maximum capability or being throttled. The method described herein determines how to adjust to the balanced case.

Figure 4:
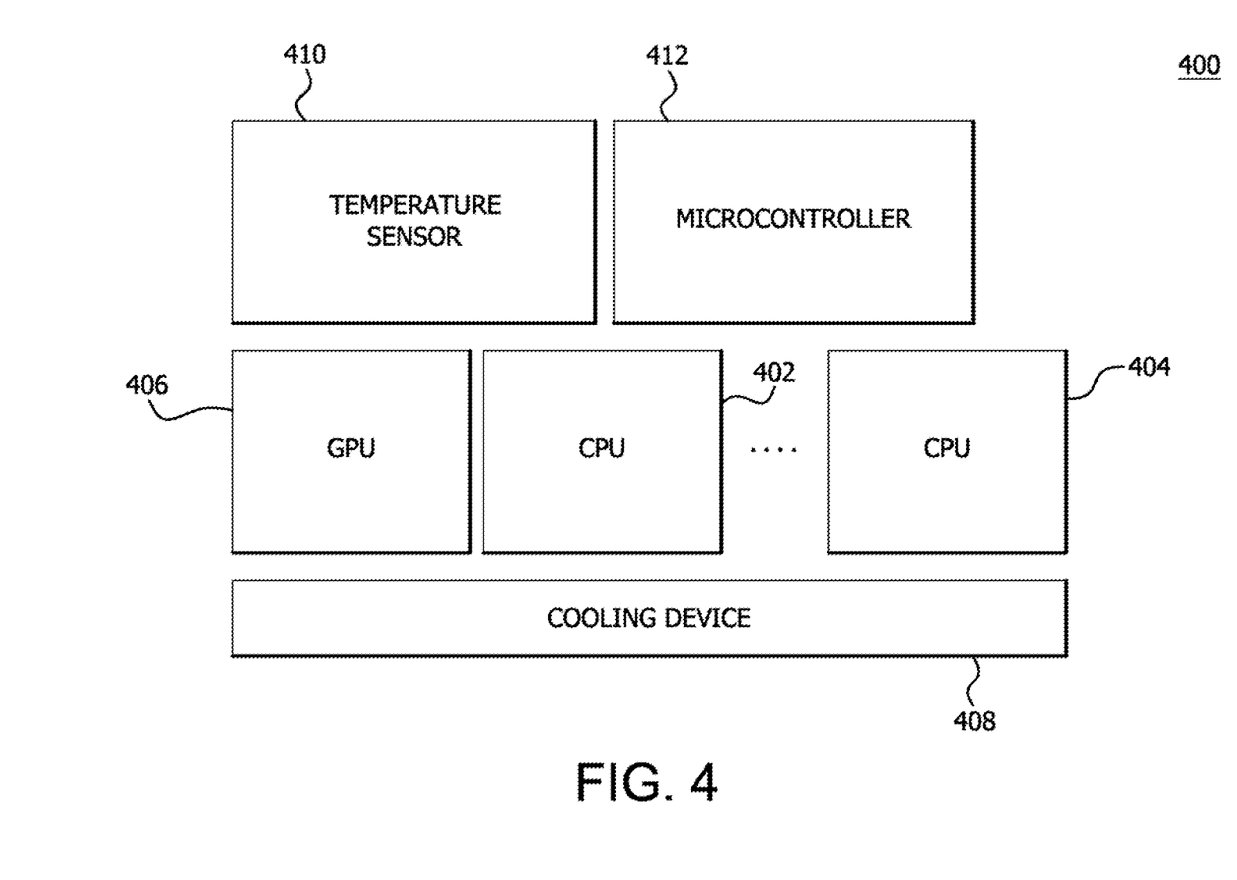
FIG. 4 is a block diagram of an example device in which some disclosed embodiments may be implemented.

FIG. 4 is a block diagram of an example device 400 in which some embodiments may be implemented. The device 400 may include, for example, a computer, a gaming device, a handheld device, a set-top box, a television, a mobile phone, or a tablet computer. The device 400 includes a plurality of CPUs 402 . . . 404 and a GPU 406. In an embodiment, the CPUs 402 . . . 404 and GPU 406 are located on the same die. A cooling device 408 draws or dissipates heat away from the CPUs 402 . . . 404 and GPU 406. The cooling device 408 may be shared by the CPUs 402 . . . 404 and GPU 406. Although shown as one module, the cooling device 408 may be a plurality of cooling devices. The cooling device 408 may be fans, heat spreaders, heat sinks, and the like. The device 400 further includes a temperature sensor 410 to measure the temperatures of the CPUs 402 . . . 404 and GPU 406 and report the measurements to a microcontroller 412. Although a single module is shown, the temperature sensor 410 may be a plurality of sensors. In an embodiment, the microcontroller 412 is an integrated microcontroller, i.e. on the same die as the compute units 402, 404 . . . 406. It is understood that the device 400 may include additional components not shown in FIG. 4.

Table 1 shows a nominal power level, middle power level and maximum power level, for example, for CPUs 402 . . . 404 and GPU 406 in a 4 CPU/1 GPU configuration. As stated above, the middle power level corresponds to the intermediate operating point. In an embodiment, the middle power level is estimated before the silicon stage by running simulations. The final value is set through characterizing the silicon behavior. For example, it is set for an ordering part number (OPN) so that performance is consistent for all parts sold under that OPN. The middle power level is chosen to optimize the efficiency of operation for the balanced case scenarios.

TABLE 1

| CPU NominalPower Level | CPU Middle Power Level | CPU Maximum Power Level | GPU Nominal Power Level | GPU Middle Power Level | GPU Maximum Power Level |
|---|---|---|---|---|---|
| 4/1 | 5.9 W | 9.25 W | 17 W | 15 W | 18 W | 25 W |

In an example scenario, the default assignment to a CPU 402 will be the nominal power level if the GPU 406 is performing any work above the idle state. This enables the GPU 406 to sustain full utilization. Using conventional allocation techniques, if the CPU 402 has temperature headroom, it will jump up to the maximum power level until the temperature limit is reached, at which time it will drop back down to the nominal power level. However, as stated above, the gap between nominal power level and maximum power level is large which causes dithering inefficiencies. In an example method, the temperature of the GPU 406 can be used to infer that dropping to the nominal power level is not necessary and that the more efficient middle power level can be used. The power assignments to the CPUs 402 ... 404 and GPU 406 can be made to better match the balanced case, i.e. the dynamically calculated temperature of each 402 ... 404 and GPU 406, enables the operating point of each to dynamically balance to maximize performance within the temperature limits.

In particular, the microcontroller 412 changes power allocations based on the temperature measurements provided by the temperature sensor 410. In general, the temperature of each of the CPUs 402 ... 404 and GPU 406 relative to each other is used to infer a workload's utilization for each CPU 402 ... 404 and GPU 406. For example, if the temperature is below a certain threshold level for GPU 406, the microcontroller 412 will give more power to CPU 404, (assuming available temperature headroom), since GPU 406 is not utilized as heavily as CPU 404. The increased power allocation to CPU 404 will improve the performance on this workload since the change in power allocation results in a different operating frequency (clock speed) and hence changes the performance. The threshold levels are selected to drive towards the balanced case. The threshold levels are chosen to be far enough below the maximum temperature to reliably indicate less than full utilization of that element, and also to ensure that there is sufficient temperature headroom for the other compute element(s) to increase performance with the additional power allocated to them at the expense of the under-utilized element. This results in balanced case operation for workloads where this is optimal.

Figure 5:
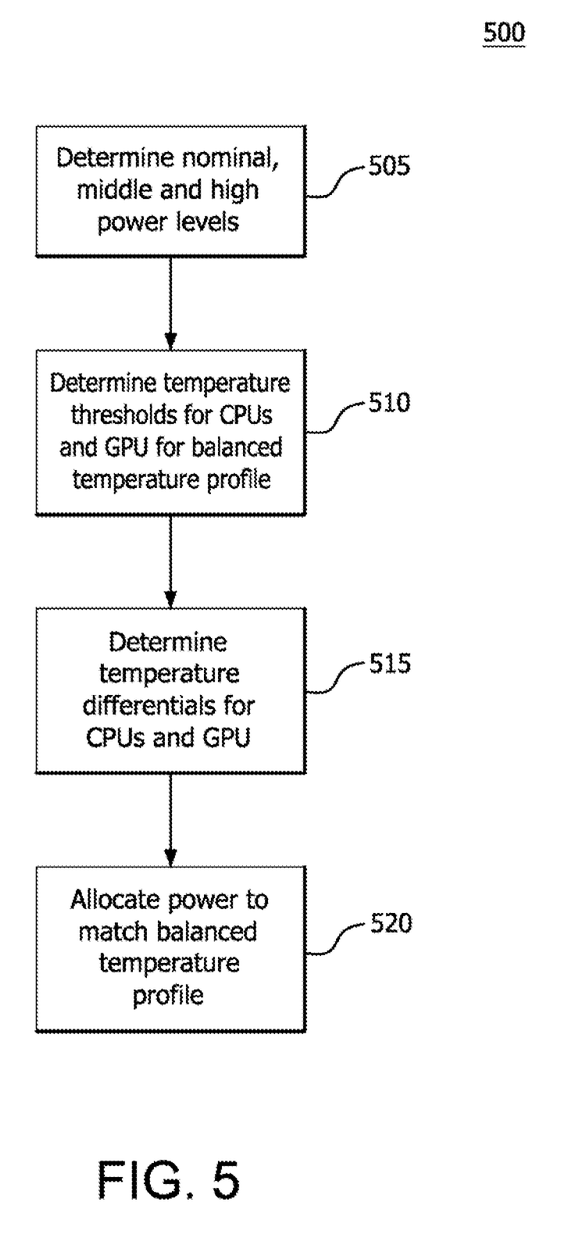
FIG. 5 is an example flowchart for power allocation based on temperature differentiation in accordance with some embodiments.

FIG. 5 is an example flowchart 500 for power allocation based on temperature differentiation for the embodiment of FIG. 4. Initially, nominal, middle and high power levels are determined for the CPUs 402 ... 404 and GPU 406 (505). A set of temperature thresholds are determined that drive the power allocation of the CPUs 402 ... 404 and GPU 406 towards a balanced temperature profile (510). For a given workload, temperature differentials are determined for each of the CPUs 402 ... 404 and GPU 406 (515). Assuming that temperature overhead is available, particular CPUs 402 ... 404 and GPU 406 are allocated power to match a balanced temperature profile (520).

Figure 6:
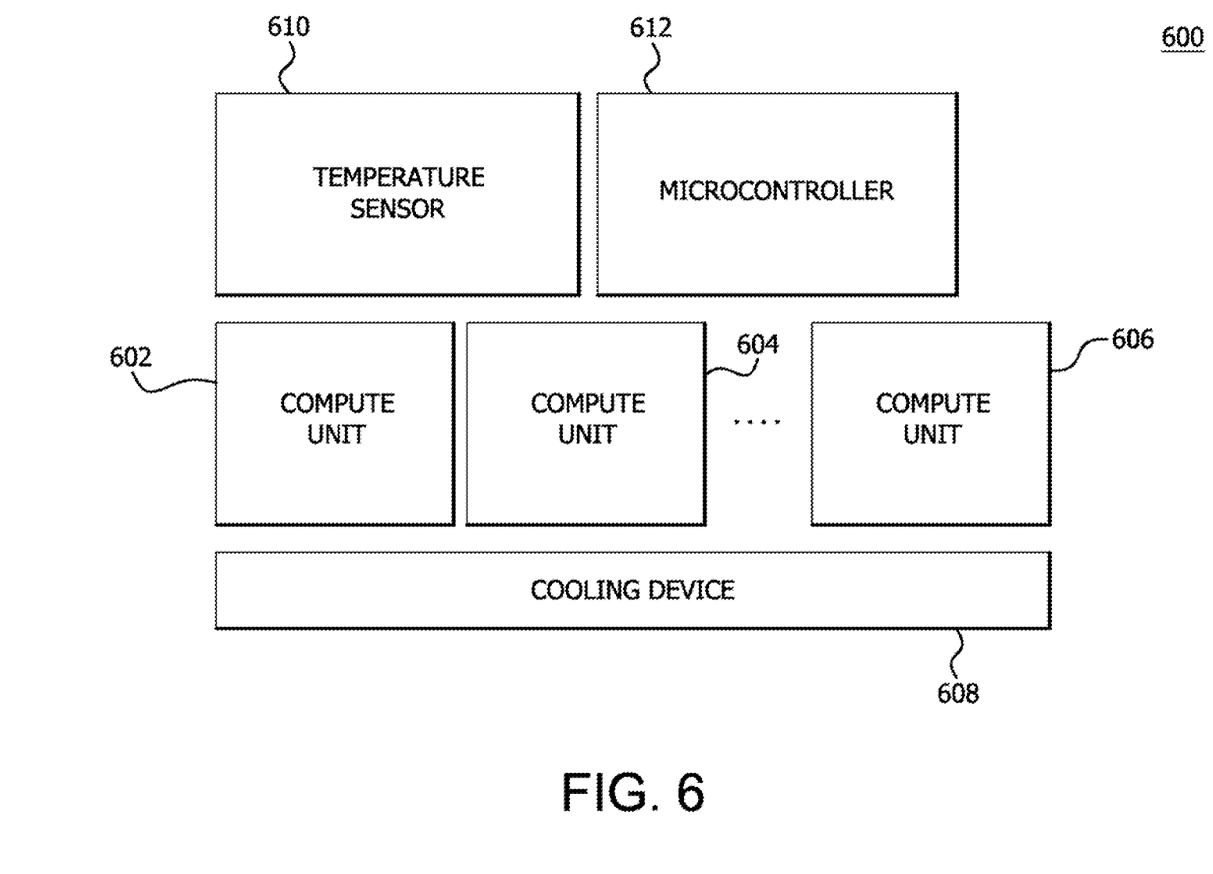
FIG. 6 is a block diagram of another example device in which some disclosed embodiments may be implemented.

FIG. 6 is a block diagram of an example device 600 in which some disclosed embodiments may be implemented. The device 600 may include, for example, a computer, a gaming device, a handheld device, a set-top box, a television, a mobile phone, or a tablet computer. The device 600 includes a plurality of compute units 602, 604 ... 606. The compute units 602, 604 ... 606 may be, but is not limited to, central processing unit (CPUs), graphics processing unit (GPUs), video accelerators, graphics accelerators, input/output accelerators and any type of device that may have a variable workload and a performance dimension. In an embodiment, the compute units 602, 604 ... 606 are located on the same die. A cooling device 608 draws or dissipates heat away from the compute units 602, 604 ... 606. In an embodiment, the cooling device 608 is shared by the compute units 602, 604 ... 606. Although shown as one module, the cooling device 608 may be a plurality of cooling devices. The cooling device 608 may be fans, heat spreaders, heat sinks, and the like. The device 600 further includes a temperature sensor 610 to measure the temperatures of the compute units 602, 604 ... 606 and report the measurements to a microcontroller 612. Although a single module is shown, the temperature sensor 610 may be a plurality of sensors. In an embodiment, the microcontroller 612 is an integrated microcontroller, i.e. on the same die as the compute units 602, 604 ... 606. It is understood that the device 600 may include additional components not shown in FIG. 6.

The microcontroller 612 changes power allocations based on the temperature measurements provided by the temperature sensor 610. In general, the temperature of a compute unit relative to the other compute units is used to infer a workload's utilization of that compute unit. For example, if the temperature is below a certain level for compute unit 602, the microcontroller 612 will give more power to compute unit 604 since compute unit 602 is not utilized as heavily as compute unit 602. The increased power allocation to compute unit 604 will improve the performance on this workload. The change in power allocation results in a different operating frequency (clock speed) and hence changes the performance. The threshold levels are selected to drive towards the balanced case. In particular, the threshold levels are chosen to enable the balanced case when it is optimal for the workload being executed.

Figure 7:
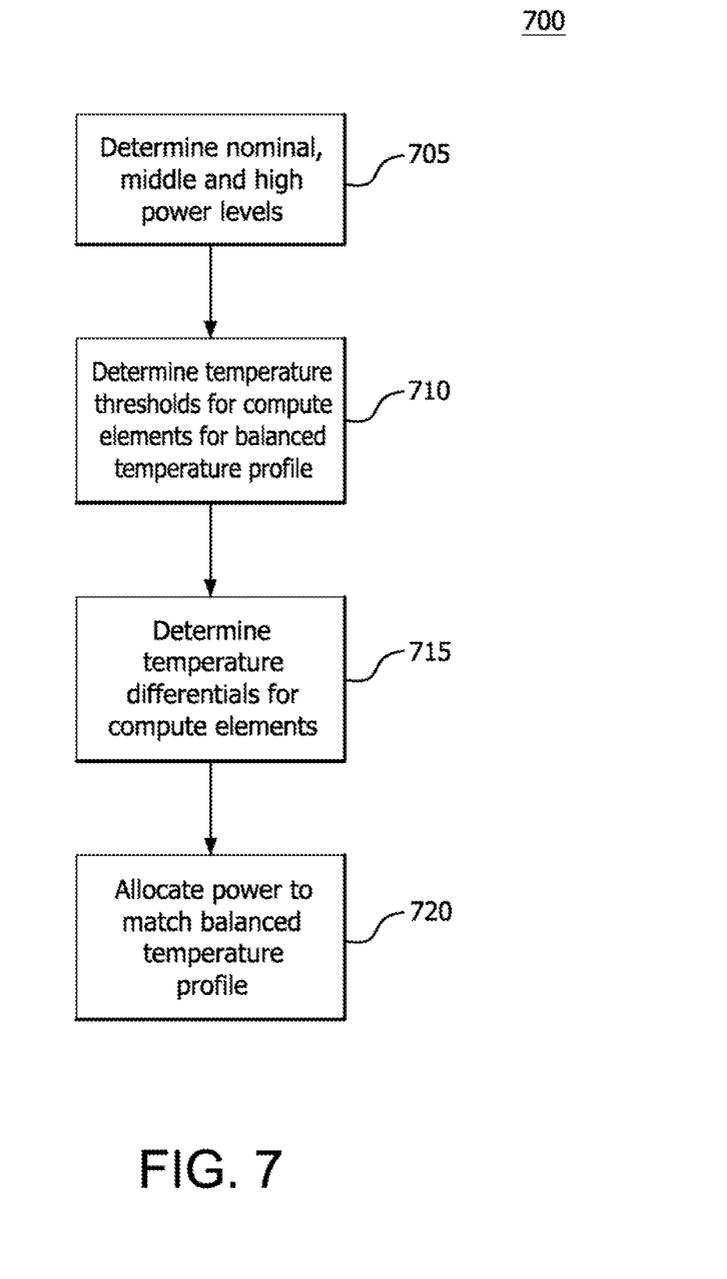
FIG. 7 is an example flowchart for power allocation based on temperature differentiation for the embodiment of FIG. 6.

FIG. 7 is an example flowchart 700 for power allocation based on temperature differentiation in accordance with some embodiments. Initially, nominal, middle and high power levels are determined for the compute units 604 (705). A set of temperature thresholds are determined that drive the power allocation of the compute units 604 towards a balanced temperature profile (710). For a given workload, temperature differentials are determined for each of the compute units 604 (715). Assuming that temperature overhead is available, particular compute units 604 are allocated power to match a balanced temperature profile (720).

Figure 8:
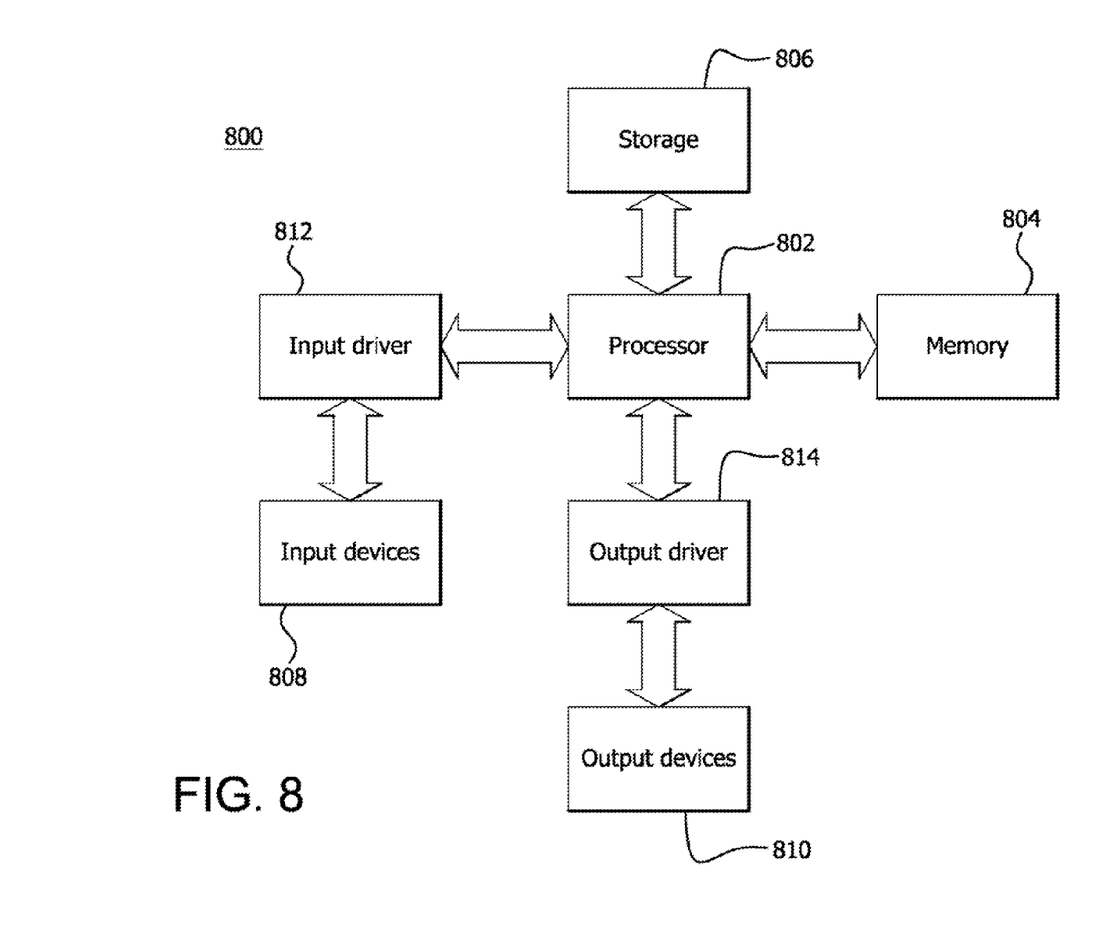
FIG. 8 is a block diagram of an example device in which some disclosed embodiments may be implemented.

FIG. 8 is a block diagram of an example device 800 in which some disclosed embodiments may be implemented. The device 800 may include, for example, a computer, a gaming device, a handheld device, a set-top box, a television, a mobile phone, or a tablet computer. The device 800 includes a processor 802, a memory 804, a storage 806, one or more input devices 808, and one or more output devices 810. The device 800 may also optionally include an input driver 812 and an output driver 814. It is understood that the device 800 may include additional components not shown in FIG. 8.

The processor 802 may include a central processing unit (CPU), a graphics processing unit (GPU), a CPU and GPU located on the same die, or one or more processor cores, wherein each processor core may be a CPU or a GPU. The memory 804 may be located on the same die as the processor 802, or may be located separately from the processor 802. The memory 804 may include a volatile or non-volatile memory, for example, random access memory (RAM), dynamic RAM, or a cache. The device 800 and processor 802 may include a cooling system, a temperature sensor and a microcontroller to implement a power allocation method based on temperature differentiation.

The storage 806 may include a fixed or removable storage, for example, a hard disk drive, a solid state drive, an optical disk, or a flash drive. The input devices 808 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 810 may include a display, a speaker, a printer, a haptic feedback device, one or more lights, an antenna, or a network connection (e.g., a wireless local area network card for transmission and/or reception of wireless IEEE 802 signals).

The input driver 812 communicates with the processor 802 and the input devices 808, and permits the processor 802 to receive input from the input devices 808. The output driver 814 communicates with the processor 802 and the output devices 810, and permits the processor 802 to send output to the output devices 810. It is noted that the input driver 812 and the output driver 814 are optional components, and that the device 800 will operate in the same manner if the input driver 812 and the output driver 814 are not present.

In general and in accordance with some embodiments, a power management system is described herein. The power management system includes one or more temperature sensors that sense temperatures of compute elements and a microcontroller that determines temperature differentials for each of the compute elements relative to the other compute elements. The microcontroller allocates power to certain compute elements if a temperature differential is below a predetermined temperature threshold for a compute element. The predetermined temperature thresholds correspond to a power level between a nominal power level and a maximum power level. The power allocation is made if the compute elements have a temperature overhead. The power allocation drives toward a balanced temperature profile for the compute elements. The temperature differentials correspond to workload utilizations of the compute elements and the predetermined temperature thresholds drive the power allocation of the compute elements towards a balanced temperature profile.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein, to the extent applicable, may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A power management system, comprising:
    at least one temperature sensor configured to sense temperatures of at least two types of compute elements;
    a microcontroller configured to determine temperature differentials for each of the compute elements relative to the other compute elements; and
    the microcontroller configured to allocate power to certain compute elements if a temperature differential is below a predetermined temperature threshold for a compute element, where the power allocation drives toward a balanced temperature profile for the compute elements, wherein the balanced temperature profile includes different temperature profiles corresponding to the at least two types of compute elements and reflects optimal performance for each compute element.

2. The power management system of claim 1, wherein the temperature differentials correspond to workload utilizations of the compute elements.

3. The power management system of claim 1, wherein the predetermined temperature thresholds drive the power allocation of the compute elements towards a balanced temperature profile.

4. The power management system of claim 1, wherein the compute elements share a cooling system.

5. The power management system of claim 1, wherein the power allocation is made if the certain compute elements have a temperature overhead.

6. The power management system of claim 1, wherein the predetermined temperature thresholds correspond to a power level between a nominal power level and a maximum power level.

7. A device, comprising:
    a plurality of compute elements including at least two types of compute elements;
    at least one temperature sensor configured to sense temperatures of the plurality of compute elements;
    a microcontroller configured to determine temperature differentials between the plurality of compute elements; and
    the microcontroller configured to allocate power to at least one compute element if a temperature differential is below a predetermined temperature threshold for another compute element, where the power allocation moves the plurality of compute elements to a balanced temperature profile, wherein the balanced temperature profile includes different temperature profiles corresponding to the at least two types of compute elements and reflects optimal performance for each compute element.

8. The device of claim 1, wherein the temperature differentials correspond to workload utilizations of the compute elements.

9. The device of claim 1, wherein the predetermined temperature thresholds drive the power allocation of the plurality of compute elements towards a balanced temperature profile.

10. The device of claim 1, wherein the plurality of compute elements share a cooling system.

11. The device of claim 1, wherein the power allocation is made if the at least one compute element has a temperature overhead.

12. The device of claim 1, wherein the predetermined temperature thresholds correspond to a power level between a nominal power level and a maximum power level.

13. A method for power allocation, comprising:
    sensing temperatures of compute elements of at least two types;
    determining temperature differentials between the compute elements; and
    allocating power to a compute element if a temperature differential is below a predetermined temperature threshold for another compute element, where the power allocation moves the compute elements to a balanced temperature profile, wherein the balanced temperature profile includes different temperature profiles corresponding to the at least two types of compute elements and reflects optimal performance for each compute element.

14. The method of claim 13, wherein the temperature differentials correspond to workload utilizations of the compute elements.

15. The method of claim 13, wherein the predetermined temperature thresholds drive the power allocation of the compute elements towards a balanced temperature profile.

16. The method of claim 13, wherein the compute elements share a cooling system.

17. The method of claim 13, wherein the power allocation is made if the compute element has a temperature overhead.

18. The method of claim 13, wherein the predetermined temperature thresholds correspond to a power level between a nominal power level and a maximum power level.

19. The method of claim 13, wherein the predetermined temperature threshold levels are set below a maximum temperature to indicate less than full utilization of a compute element and ensure sufficient temperature headroom for the other compute elements to increase performance with the additional power allocated to the compute elements at the expense of the underutilized compute element.

20. The method of claim 13, further comprising:
    determining a set of temperature thresholds that correspond to a balanced temperature profile.

21. A computer readable non-transitory medium including instructions which when executed in a processing system cause the processing system to execute a method for power allocation, the method comprising:
    sensing temperatures of compute elements of at least two types;
    determining temperature differentials between the compute elements; and
    allocating power to a compute element if a temperature differential is below a predetermined temperature threshold for another compute element, where the power allocation moves the compute elements to a balanced temperature profile, wherein the balanced temperature profile includes different temperature profiles corresponding to the at least two types of compute elements and reflects optimal performance for each compute element.

* * * * *